US012613222B2

(12) United States Patent 
Shinjo et al.

(10) Patent No.: US 12,613,222 B2 
(45) Date of Patent: Apr. 28, 2026

(54) MOLECULAR SENSOR AND MOLECULAR DETECTION APPARATUS

(71) Applicant: KABUSHIKI KAISHA TOSHIBA, Tokyo (JP)

(72) Inventors: Yasushi Shinjo, Kawasaki Kanagawa (JP); Hirohisa Miyamoto, Kamakura Kanagawa (JP); Reiko Yoshimura, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 585 days.

(21) Appl. No.: 18/184,786

(22) Filed: Mar. 16, 2023

(65) Prior Publication Data 
US 2024/0102965 A1 Mar. 28, 2024

(30) Foreign Application Priority Data 
Sep. 16, 2022 (JP) ................................. 2022-148593

(51) Int. Cl. 
$G01N\ 1/00$ (2006.01) 
$G01N\ 29/04$ (2006.01) 
(52) U.S. Cl. 
CPC ... *G01N 29/041* (2013.01); *G01N 2291/0255* (2013.01); *G01N 2291/0256* (2013.01)
(58) Field of Classification Search 
None 
See application file for complete search history.

(56) References Cited

U.S. PATENT DOCUMENTS

| | | | |
|---|---|---|---|
| 2018/0052130 A1 | 2/2018 | Farhat et al. | |
| 2018/0266977 A1 | 9/2018 | Hashizume | |
| 2019/0292449 A1 | 9/2019 | Shinjo et al. | |
| 2020/0191687 A1 | 6/2020 | Shinjo et al. | |
| 2021/0293756 A1 | 9/2021 | Shinjo et al. | |
| 2023/0168166 A1 | 6/2023 | Kaneto et al. | |

FOREIGN PATENT DOCUMENTS

| | | |
|---|---|---|
| JP | S61-80038 A | 4/1986 |
| JP | 2006-313105 A | 11/2006 |
| JP | 2010-71716 A | 4/2010 |
| JP | 5404534 B2 | 2/2014 |
| JP | 2019-124700 A | 7/2019 |
| JP | 2019-163228 A | 9/2019 |
| JP | 2020-98113 A | 6/2020 |
| JP | 2021-6643 A | 1/2021 |
| JP | 2022-7969 A | 1/2022 |

(Continued)

OTHER PUBLICATIONS

Japan Patent Office, Office Action in App. No. 2022-148593, 4 pages, and machine translation, 4 pages (May 7, 2025).

(Continued)

*Primary Examiner* — Jyoti Nagpaul 
(74) *Attorney, Agent, or Firm* — Finnegan, Henderson, Farabow, Garrett & Dunner, LLP

(57) ABSTRACT

A molecular sensor includes: a base; and a sensitive film provided above the base and containing a metal organic framework and a hydrophobic polymer, a contact angle respect to water of the hydrophobic polymer being larger than that of the metal organic framework. The metal organic framework is on the base side of the sensitive film, and the hydrophobic polymer is above the metal organic framework in the sensitive film.

14 Claims, 13 Drawing Sheets

(56) References Cited

FOREIGN PATENT DOCUMENTS

| JP | 2022-21753 A | 2/2022 |
| JP | 2022-27167 A | 2/2022 |

OTHER PUBLICATIONS

Suttipong Wannapaiboon et al., "Hierarchical structuring of metal-organic framework thin-films on quartz crystal microbalance (QCM) substrates for selective adsorption applications," J. Mater. Chem. A, Accepted Manuscript, 11 pages (2015).

Lars Heinke et al., "The surface barrier phenomenon at the loading of metal-organic frameworks," Nature Communications, vol. 5, Art. 4562, DOI: 10.1038/ncomms5562, 6 pages (2014).

Erika Virmani et al., "On-Surface Synthesis of Highly Oriented Thin Metal-Organic Framework Films through Vapor-Assisted Conversion," J. Am. Chem. Soc. 2018, vol. 140, pp. 4812-4819, DOI: 10.1021/jacs.7b08174 (2018).

Shengran Cai et al., "In situ construction of metal-organic framework (MOF) UiO-66 film on Parylene-patterned resonant microcantilever for trace organophosphorus molecules detection," The Royal Society of Chemistry, Analyst, vol. 144, No. 12, pp. 3729-3735, DOI: 10.1039/c8an02508h (2019).

A1-A2 CROSS SECTION

B1-B2 CROSS SECTION 100 nm                    Si K

| ELEMENT | QUANTITATIVE VALUE (at%) | | |
|---|---|---|---|
| | PORTION 31 | PORTION 32 | PORTION 33 |
| Si | 32.29 | 18.60 | 16.43 |
| Zr | 0.82 | 9.91 | 8.79 |
| Si/Zr | 39.38 | 1.88 | 1.87 |

100 nm

MOLECULAR SENSOR AND MOLECULAR DETECTION APPARATUS

CROSS-REFERENCE TO RELATED APPLICATIONS

This application is based upon and claims the benefit of priority from Japanese Patent Applications No. 2022-148593, filed on Sep. 16, 2022; the entire contents of which are incorporated herein by reference.

FIELD

Embodiments relate to a molecular sensor and a molecular detection apparatus.

BACKGROUND

A sensing technology using an odor (gas) sensor can digitize smell in the air. This technology is widely used for odor determination, measurement of volatile organic compounds (VOC) in the atmosphere, performance confirmation of air cleaners, trouble detection of devices, and so on. In recent years, interest has been rising with respect to applications for detection of explosives and detection of narcotic drugs and stimulant drugs that have depended on the sense of smell of dogs so far, and for diagnosis of specific diseases based on exhalation, and the like. Therefore, it has been desired to enhance the performance of the smell (gas) sensor.

As a conventional gas sensing method, there can be cited devices such as a flame ionization detector (FID), a photo-ionization detector (PID), and a non-dispersive infra-red (NDIR) gas analyzer. These devices are demanded to improve portability, reduce risk due to the use of a flammable gas, improve life and price of a light source used for the measurement, and improve substance recognition performance, and so on. Further, the development of a small-sized sensor advantageous for incorporation into industrial robots and for the measurement at a work site has been in progress.

A semiconductor gas sensor being a small-sized sensor is one that measures a gas concentration by using a change in electrical properties such as electrical resistance that occurs when oxygen adsorbed on metal oxides is consumed by a reducing substance. In recent years, as metal oxides, various kinds of metal oxides such as tin oxide ($SnO_2$), zinc oxide ($ZnO_2$), indium oxide ($In_2O_3$), tungsten oxide ($WO_3$), and vanadium oxide ($V_2O_3$) have been used. Further, studies have been conducted for enhancing sensitivity and improving selectivity by doping these oxides with palladium (Pd), platinum (Pt), gold (Au), silver (Ag), or the like, for example. However, the sensitivity and the selectivity are not yet sufficient. On the other hand, from a viewpoint of further improvement of sensitivity, selectivity, simplicity, rapidity, reliability, stability, and so on of an odor (gas) sensor, a mass detection-type sensor using a quartz crystal microbalance (QCM), a surface acoustic wave (SAW), a micro cantilever (MCL), or the like, has also been attracting attention in recent years. In the case of QCM, for example, there is known a sensor in which a sensitive film such as an organic polymer that adsorbs target molecules is formed on a surface of a device.

When target molecules are adsorbed by a sensitive film, a mass of the film is increased to change a resonant frequency of a quartz crystal oscillator. The change amount of frequency is in proportion to a mass of the adsorbed analyte molecules, and thus a concentration of the analyte molecules can be measured. Metal organic frameworks are called MOF based on an acronym thereof, and are new porous materials that have been studied extensively in recent years. This material is composed of metal ions and organic ligands connecting the metal ions, and is a structure having a large number of pores with nanometer size. It is characterized by a large specific surface area of up to 10,000 m2/g and heat resistance exceeding 300° C., and it is expected to be applied to various fields such as gas storage and separation, refining, catalysts, batteries, sensors, and so on.

DETAILED DESCRIPTION

A molecular sensor of an embodiment includes: a base; and a sensitive film provided above the base and containing a metal organic framework and a hydrophobic polymer, a contact angle respect to water of the hydrophobic polymer being larger than that of the metal organic framework. The metal organic framework is on the base side of the sensitive film, and the hydrophobic polymer is above the metal organic framework in the sensitive film.

Hereinafter, embodiments will be explained with reference to the drawings. Note that in each embodiment, substantially the same constituent parts are denoted by the same reference signs and an explanation thereof will be partly omitted in some cases. The drawings are schematic, and a relation of the thickness and the planar dimension of each part, a thickness ratio of each part, and so on may differ from actual ones in some cases.

Figure 1:
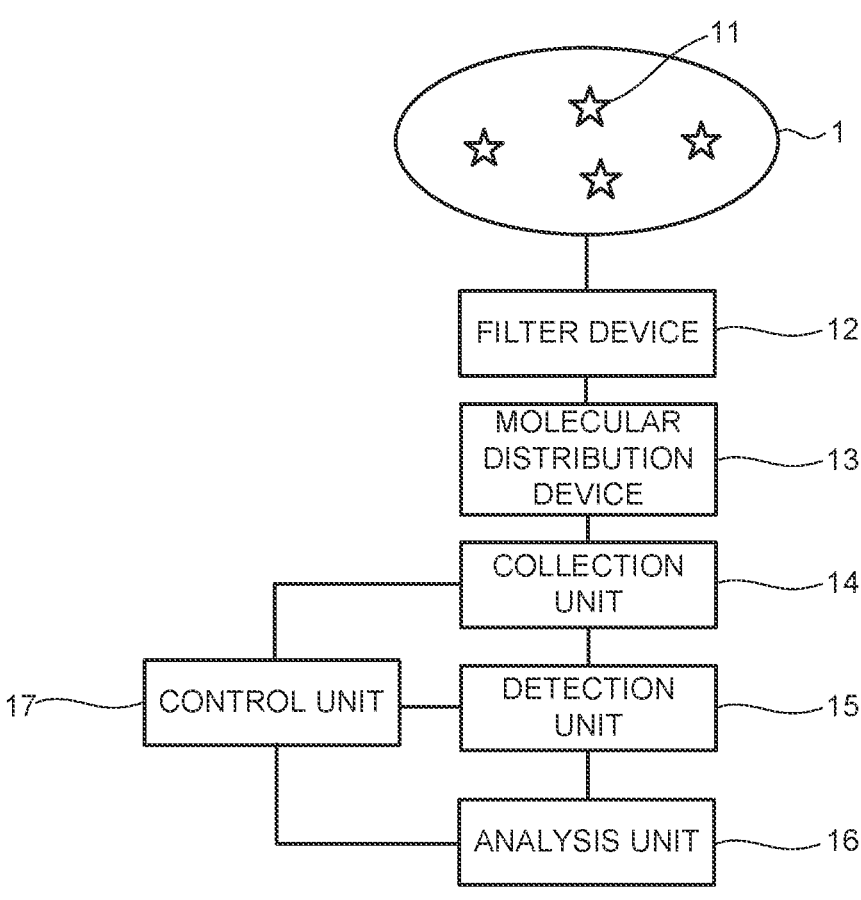
FIG. 1 is a block diagram illustrating a configuration example of a molecular detection apparatus.

FIG. 1 is a block diagram illustrating a configuration example of a molecular detection apparatus of an embodiment. The molecular detection apparatus illustrated in FIG. 1 is an apparatus that detects target molecules (detection target objects) 11 in a fluid 1 generated from a gas generating source, for instance, and includes a filter device 12, a molecular distribution device 13, a collection unit 14, a detection unit 15, an analysis unit 16, and a control unit 17.

The collection unit 14 collects the fluid 1 containing the target molecules 11. The fluid 1 is in a liquid form or a gaseous form. The collection unit 14 has a collection port for the fluid 1, and is connected to a pump via a flow path. The collection unit 14 may include a filter that removes impurities such as fine particles contained in the fluid 1. Incidentally, a valve may be provided instead of the pump, and the start and stop of the introduction of the fluid 1 may be controlled by the opening/closing of the valve.

The fluid 1 may contain, as impurities, a substance having a molecular weight, a molecular structure, and so on similar to the molecular weight, the molecular structure, and so on of the target molecules 11. Further, the target molecules 11 floating in the air are often present as a mixture with various contaminants such as smell components and fine particles. Because of this, the fluid 1 is preferably pre-processed by the filter device 12, the molecular distribution device 13, and so on in advance to be thereafter sent to the collection unit 14.

As the filter device 12, a general moderate-to-high performance filter or the like is used. In the filter device 12, particulate substances such as fine particles contained in the fluid 1 are removed. The fluid 1 from which the particulate substances have been removed in the filter device 12 is sent to the molecular distribution device 13. The molecular distribution device 13 is, for example, a device that ionizes the fluid 1 into an ionized substance group, applies a voltage to the ionized substance group to cause the ionized substance group to fly at a speed proportional to a mass, and separates ionized substances of the target molecules 11 from the ionized substance group by utilizing the flying speed depending on a mass difference and the time of flight determined by the flying speed. As such a molecular distribution device, a device including an ionizing part, a voltage applying part, and a time-of-flight separation part is used. It should be noted that the filter device 12 and the molecular distribution device 13 do not necessarily have to be provided.

The fluid 1 is collected in the collection unit 14 as it is or after pre-processed by devices such as the filter device 12 and the molecular distribution device 13. The fluid 1 collected in the collection unit 14 is sent to the detection unit 15 via a flow path.

The detection unit 15 is disposed in the flow path. The detection unit 15 has a molecular sensor for detecting the target molecules 11. The detection unit 15 outputs an electrical signal based on the detected target molecules 11 to the analysis unit 16.

The analysis unit 16 has a signal processing part that processes the electrical signal from the detection unit 15 to identify the target molecules 11. The analysis unit 16 identifies the target molecules 11 by, for example, comparing a change in the electrical signal before and after the introduction of the fluid 1 and pre-stored electrical signal change data corresponding to the relevant molecules.

The control unit 17 is electrically connected to the collection unit 14, the detection unit 15, and the analysis unit 16, respectively, and outputs control signals to the respective units. For example, by means of the control signals, the control unit 17 controls the start and stop of the introduction of the fluid 1 to the detection unit 15. The control unit 17 may further control the identification of the target molecules 11 performed by the analysis unit 16, by means of the control signal.

The analysis unit 16 and the control unit 17 each may be configured, for example, using hardware that uses a processor or the like. Incidentally, the operations may be pre-stored as operating programs in a computer-readable recording medium such as a memory, and the operations may be executed by reading the operating programs stored in the recording medium by the hardware when necessary.

Next, an example of a molecular sensor capable of being used for the detection unit 15 will be described hereinbelow.

First Embodiment

Figure 2A:
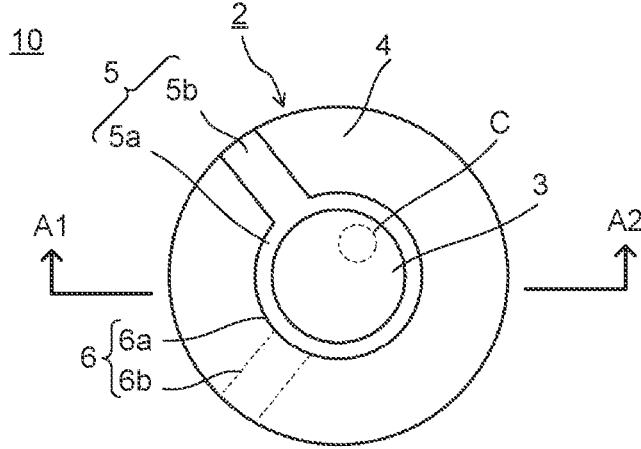
FIG. 2A is a schematic view illustrating an example of a molecular sensor.
Figure 2B:
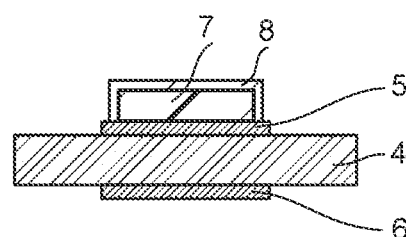
FIG. 2B is a schematic view illustrating an example of the molecular sensor.
Figure 2C:
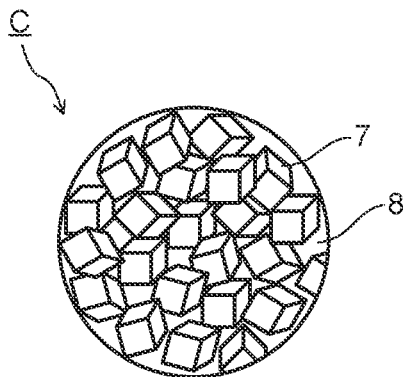
FIG. 2C is a schematic view illustrating an example of the molecular sensor.

Each of FIG. 2A, FIG. 2B, and FIG. 2C is a schematic view illustrating an example of a molecular sensor of a first embodiment. FIG. 2A illustrates a plan view of the molecular sensor. FIG. 2B is a cross-sectional view taken along a line segment A1-A2 in FIG. 2A. FIG. 2C is an enlarged view of a surrounded portion C in FIG. 2A. The molecular sensor in the first embodiment has a measuring device using a quartz crystal microbalance (QCM) as a detection unit.

A molecular sensor 10 has a QCM detection unit 2, and a sensitive film 3 provided to a surface of the QCM detection unit 2. The QCM detection unit 2 has a disk-shaped base 4, an upper electrode 5, and a lower electrode 6.

An example of the base 4 includes a quartz crystal substrate. The base 4 is preferably an AT-cut quartz crystal substrate, for example. A planar shape of the base 4 is not limited to the disk shape as illustrated in FIG. 2A, and it may also be a polygon or the like.

The upper electrode 5 is provided on the base 4. As illustrated in FIG. 2A, for example, the upper electrode 5 includes an upper excitation part 5a that is concentric with the base 4 and has a diameter smaller than that of the base 4, and an upper lead-out part 5b that extends from a part of a peripheral edge of the upper excitation part 5a to a peripheral edge of the base 4.

The lower electrode 6 is provided under the base 4. The lower electrode 6 includes a lower excitation part 6a that is concentric with the base 4 and has a diameter smaller than that of the base 4, and a lower lead-out part 6b that extends from a part of a peripheral edge of the lower excitation part 6a to the peripheral edge of the base 4.

The upper electrode 5 and the lower electrode 6 are, for example, two thin sheet-shaped electrodes that are arranged by sandwiching the base 4 therebetween. The upper electrode 5 and the lower electrode 6 preferably contain a material such as, for example, platinum (Pt), gold (Au), silver (Ag), copper (Cu), molybdenum (Mo), nickel (Ni), titanium (Ti), tungsten (W), aluminum (Al), indium-tin oxide (ITO), or aluminum-doped zinc oxide (AZO). An example of the upper electrode 5 and the lower electrode 6 includes a stacked film having a Ti layer with a thickness of 10 nm, and an Au layer provided on the Ti layer and having a thickness of 200 nm. In order to secure adhesiveness with the sensitive film 3, it is also possible to further stack, as a base layer, a Ti layer with a thickness of 10 nm and a silicon oxide ($SiO_2$) layer with a thickness of 100 nm on a surface layer of the above Au electrode. The upper electrode 5 and the lower electrode 6 may not have the shapes as illustrated in FIG. 2A, as long as they have shapes capable of exciting the base 4.

The sensitive film 3 is provided on a surface of the upper excitation part 5a on the opposite side of the base 4 (upper surface), for example. The configuration is not limited to this, and the sensitive film 3 may also be provided on a surface of the lower excitation part 6a on the opposite side of the base 4 (lower surface).

As illustrated in FIG. 2B and FIG. 2C, the sensitive film 3 has a metal organic framework (MOF) 7, and a hydrophobic polymer 8.

Figure 3:
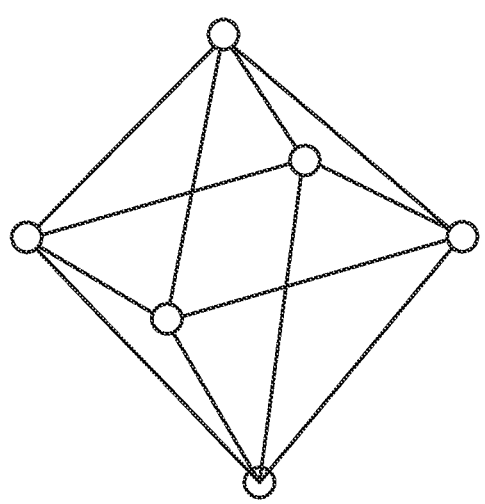
FIG. 3 is a schematic view illustrating an example of MOF having a structure in which dicarboxylic acids are coordinated to a $Zr_6O_4(OH)_4$ cluster.

The metal organic framework 7 preferably contains zirconium (Zr) as its main component, which is because the Zr-based MOF has high heat resistance and high water resistance. The main component indicates a component whose content is larger than that of the other components. In particular, it is preferable to use MOF in which an organic ligand is bonded to a hexanuclear $Zr_6O_4(OH)_4$ cluster. It is more preferable to use MOF having a structure in which dicarboxylic acids are coordinated to a $Zr_6O_4(OH)_4$ cluster, as illustrated in FIG. 3. In the structure illustrated in FIG. 3, ○ (white circle) indicates a $Zr_6O_4(OH)_4$ cluster, and a solid line indicates a dicarboxylic acid ligand. In the case of defect free crystal, the hexanuclear $Zr_6O_4(OH)_4$ cluster can be a structure in which 12 dicarboxylic acids coordinate to a hexanuclear $Zr_6O_4(OH)_4$ cluster.

An example of the MOF having such a structure is at least one of UIO-66, UIO-67, UIO-68, and their derivatives. The UIO-66, the UIO-67 and the UIO-68 have structures in which the dicarboxylic acid ligands are 1,4-benzenedicarboxylic acid, 4,4'-biphenyldicarboxylic acid, and 4,4''-terphenyldicarboxylic acid, respectively.

The derivatives mean organic compounds having functional groups newly introduced into benzene rings of ligands included in the MOFs. Examples of the functional groups to be introduced include an alkyl group, an amino group, a hydroxy group, an alkoxy group, an amide group, a nitro group, a sulfo group, an aldehyde group, an acyl group, an ester group, a carbonyl group such as a carboxyl group, a halogen group such as fluorine, chlorine, bromine, or iodine, and the like. Examples of the derivatives include organic compounds in each of which a benzene ring of a ligand is substituted with a hetero-aromatic ring such as a pyridine ring or an imidazole ring.

An example of the UIO-67 also includes an organic compound in which the 4,4'-biphenyldicarboxylic acid is substituted with a heterocyclic compound such as 9-fluorenone-2,7-dicarboxylic acid, fluorene-2,7-dicarboxylic acid, or carbazole-2,7-dicarboxylic acid.

These MOFs have high heat resistance and high water resistance, and not only that, synthesis thereof is relatively easy, a range of choices of formation methods from a formation method of microcrystals to a formation method of thin films is wide, and thus they are easily applied to the sensitive film 3. Other than the above, as MOF containing Zr as its main component, it is possible to use MOF-801, MOF-808, NU-1000, CAU-24, or the like. Further, other than the Zr-based MOF, it is possible to use MOF such as MIL-53, MIL-101, MOF-74, or ZIF-8.

The MOF has a micropore, and a size of the micropore is 1 nm or less in many cases, although it is different depending on the type and the organic ligand of the metal organic framework. A molecule larger than the micropore of the metal organic framework is not adsorbed, but a molecule smaller than the micropore is adsorbed, and thus it is possible to use a metal organic framework whose pore size is different according to the size of the target molecule 11. When the MOF film is introduced as the sensitive film 3, there is known, as a QCM sensor, for example, a sensor in which a dense thin film with high crystallinity and orientation is formed by using a layer by layer (LBL) method in which a film is stacked one layer by one layer to be grown, or the like. However, the type of MOF to which this method can be applied, is limited. Further, in a case of a single crystalline thin film, the target molecule is adsorbed only by a pore that exists at the uppermost surface. Therefore, if the pore at the uppermost surface is blocked by a water molecule or the like, the sensitivity is lowered extremely. Such a phenomenon is known as a surface barrier phenomenon. Therefore, the sensitive film 3 preferably has a particle of the metal organic framework, and an average particle size of the particle is preferably 5 nm or more and 500 nm or less. When the average particle size is smaller than 5 nm, the property as a three-dimensional structure is reduced, and physical and chemical stability is lowered, which is likely to cause deterioration and decomposition. When the average particle size is larger than 500 nm, a cohesive force between particles is reduced as well, resulting in that the film easily becomes fragile. Based on such a tendency, the average particle size is more preferably 10 nm or more and 100 nm or less.

The hydrophobic polymer 8 has a contact angle with respect to water larger than that of the metal organic framework 7. The hydrophobic polymer 8 is preferably a polymer having gas permeability and having a hydrophobic property higher than that of MOF. The hydrophobic polymer 8 preferably contains an organosilicon polymer or a fluoropolymer as its main component. Note that the hydrophobic polymer 8 may also contain both the organosilicon polymer and the fluoropolymer. The hydrophobic polymer 8 may be mixed with the other organic materials, but it is preferable that 80 mass % or more thereof is a polymer containing the organosilicon polymer or the fluoropolymer as a main component. As the organosilicon polymer, organopolysiloxane is preferable. As the organopolysiloxane, there can be exemplified polymethylphenylsiloxane, polytrifluoropropylmethylsiloxane, or the like, other than polydimethylsiloxane (PDMS). Further, the organopolysiloxane may be crosslinked through peroxide vulcanization, addition reaction vulcanization, or condensation reaction vulcanization, and it may also be a so-called silicone resin. For various kinds of organopolysiloxane, it is possible to refer to ""Silicone handbook", edited by Kunio Ito, THE NIKKAN KOGYO SHIMBUN, LTD., Tokyo (1990), p.p. 88 to 109". Further, other than the organopolysiloxane, it is also possible to employ a polymer of 2-substituted acetylenic unsaturated compound substituted with a group containing an organic silyl group such as a trimethylsilyl group typified by 1-(trimethylsilyl)-1-propyne. Further, although the fluoropolymer is not limited in particular, one capable of being coated in the form of solvent, such as a perfluoroalkyl acrylate copolymer, a copolymer of vinyl ether and fluoroolefin as typified by LUMIFLON manufactured by AGC Inc., or a butenyl vinyl ether copolymer as typified by CYTOP manufactured by AGC Inc., can be preferably used.

A contact angle with respect to water of the uppermost surface of the sensitive film 3 is preferably 60 degrees or more. When the contact angle is less than 60 degrees, there is a case where water enters the sensitive film 3 to deteriorate the metal organic framework 7.

Figure 4A:
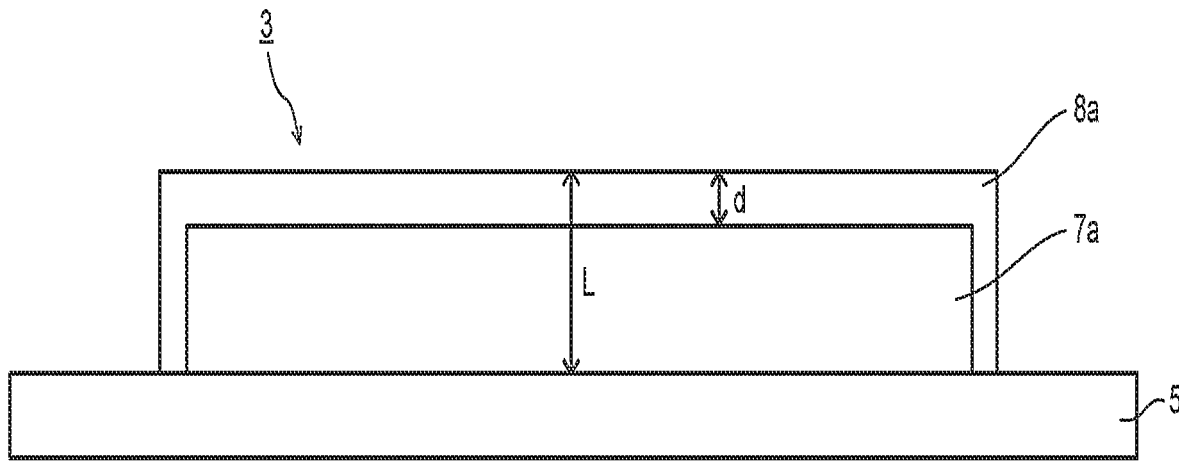
FIG. 4A is a schematic cross-sectional view for explaining a structural example of an example of a sensitive film 3.

In the sensitive film 3, the MOF 7 exists on the base 4 side, and the hydrophobic polymer 8 exists on the MOF 7. Specifically, the hydrophobic polymer 8 exists directly on the MOF 7. The MOF 7 and the hydrophobic polymer 8 are stacked. In a region between the hydrophobic polymer 8 and the MOF 7, a concentration of the hydrophobic polymer 8 is sometimes 100 mass % on the hydrophobic polymer 8 side and 0 mass % on the MOF 7 side, as in a case where the hydrophobic polymer 8 is not included in the MOF 7 side, for example. Further, the region between the hydrophobic polymer 8 and the MOF 7 includes a case where the hydrophobic polymer 8 enters the MOF 7 side, for example, and thus it may have a concentration gradient. This concentration gradient is preferably noticeable in the region between the hydrophobic polymer 8 and the MOF 7. The term of noticeable means that an inclination of the concentration gradient becomes the maximum. For example, the concentration of the hydrophobic polymer 8 changes more noticeably in the region between the hydrophobic polymer 8 and the MOF 7, than in a region other than the aforementioned region of the sensitive film 3, for example. FIG. 4A is a schematic cross-sectional view for explaining a structural example of the sensitive film 3. The sensitive film 3 illustrated in FIG. 4A has a layer of the MOF 7 and a layer of the hydrophobic polymer 8, and the layer of the hydrophobic polymer 8 is provided to cover the layer of the MOF 7. The MOF 7 is, for example, MOF whose main component is Zr, and the hydrophobic polymer 8 is an organosilicon polymer or a fluoropolymer, for example.

The layer of the hydrophobic polymer 8 and the layer of the metal organic framework 7 are analyzed by using an analysis method such as energy dispersive X-ray spectroscopy (EDX), by performing a cross-section observation of the sensitive film 3 by using an optical microscope, a scanning transmission electron microscope (STEM), a transmission electron microscope (TEM), or a scanning electron microscope (SEM). When a metal element is detected by an EDX spectrum, there is a possibility of being MOF containing the metal as its main component, so that based on a higher-resolution high-angle annular dark-field (HAADF)-STEM image or the like, it is possible to acquire information regarding a crystal structure, to thereby specify the type of the MOF 7. Further, since oxygen (O) and carbon (C) are elements common to an organic matter, distinction thereof is difficult, but if silicon (Si) and fluorine (F) are detected, there is a high possibility of containing the hydrophobic polymer 8, so that an element mapping analysis regarding the metal element of the MOF 7, Si, and F is performed. In particular, when the main component of the MOF 7 is Zr and the hydrophobic polymer 8 is an organosilicon polymer, it is possible to distinguish the layer of the metal organic framework 7 from the layer of the hydrophobic polymer 8 by performing an element mapping analysis of Si and Zr. More specifically, the element mapping analysis and a line analysis are performed, and a region in which an element concentration ratio Si/Zr of Si and Zr is 10 or more in the sensitive film 3 is defined as the layer of the hydrophobic polymer 8 (a surface covering layer). However, a peripheral edge portion of the sensitive film 3 contains, as a singularity, an organosilicon polymer component as a main component, so that judgment of the element analysis is performed based on a cross-sectional profile of a region within 25% of a total area of the sensitive film 3 from a center portion of the sensitive film 3, when a surface of the sensitive film 3 is seen from above. In the cross-sectional profile, a concentration ratio Si/Zr of the Si element and the Zr element is calculated at a plurality of portions at different positions in a thickness direction in the order from the surface side of the sensitive film 3, in which a portion with the concentration ratio of 10 or more is defined as a region of the hydrophobic polymer 8, and a portion with the concentration ratio Si/Zr of less than 10 is defined as a region of the metal organic framework 7 or a mixed region of the metal organic framework 7 and the hydrophobic polymer 8. This mixed region is included in the region.

Figure 4B:
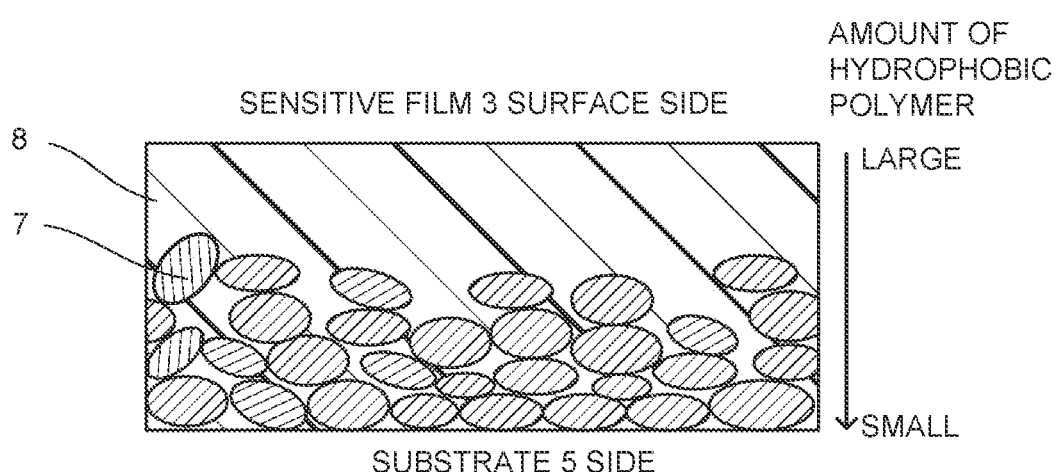
FIG. 4B is a schematic enlarged view of a part of the sensitive film 3 illustrated in FIG. 4A.

FIG. 4B is a schematic enlarged view of a part of the sensitive film 3 illustrated in FIG. 4A. As illustrated in FIG. 4B, a concentration of the hydrophobic polymer 8 has a concentration gradient such that it decreases from the uppermost surface of the sensitive film 3 toward a substrate 5 along a thickness direction of the sensitive film 3, and the concentration gradient appears noticeably in the region between the hydrophobic polymer 8 and the MOF 7 in particular. Regarding this, the concentration gradient is noticeable in the region between the hydrophobic polymer 8 and the MOF 7 when the MOF is a particle as illustrated in FIG. 4B, and even in a case where the MOF is formed in a plate shape, the concentration gradient is similarly noticeable in the region between the hydrophobic polymer 8 and the MOF 7.

The thickness of the sensitive film 3 can be measured by using the following method, for example. First, a portion formed with the sensitive film 3 of the molecular sensor is taken out, the sensitive film 3 is checked at a low magnification so as to include the entire sensitive film 3 in a field of view, and at a position where apparently specific cracks, defects, projections, foreign matters, and so on do not exist, the portion is cut in the film thickness direction of the sensitive film 3. Next, the sensitive film 3 is subjected to focused ion beam (FIB) machining, and then the cut cross section is observed. Here, as the FIB apparatus, it is possible to use, for example, SMI3300SE manufactured by Hitachi, Ltd., or Strata 400s manufactured by FEI Company. The observation of the entire film and the observation of the cross section can be performed by using, for example, the optical microscope, the STEM, the TEM, or the SEM.

After obtaining the cross section in the film thickness direction of the sensitive film 3 through the above FIB machining, a mapping image regarding an element (Zr or the like) derived from a component of the metal organic framework 7 and an element Si or F derived from a component of the hydrophobic polymer 8 in the entire cross section, is captured by the EDX. Accordingly, it is possible to distinguish a layer of the hydrophobic polymer 8 from a layer of the metal organic framework 7.

When, at the time of performing the observation of cross section described above, there is a portion where the hydrophobic polymer 8 does not exist so that the metal organic framework 7 is exposed, a portion where the metal organic framework 7 does not exist so that only the hydrophobic polymer 8 exists, or a film defect portion where both the metal organic framework 7 and the hydrophobic polymer 8 do not exist, this cross section is not employed, and until when a cross section capable of being employed is obtained, the selection of cutting location in the entire sensitive film 3 and the observation of the cross section of the sensitive film 3 described above are performed, to thereby select a cross section at which the film thickness measurement of the sensitive film 3 is performed. By the selection of cutting location in the entire sensitive film 3, the observation of the cross section of the sensitive film 3, and the selection of the cross section at which the film thickness measurement of the sensitive film 3 is performed described above, cross sections at three or more of different locations in the sensitive film 3, for example, are selected.

After selecting the cross section at which the film thickness measurement of the sensitive film 3 is performed, the film thickness of the sensitive film 3 is measured by the above-described STEM or the like. At this time, when selecting an observation portion, the observation of cross section is performed at a magnification at which the entire region formed with the sensitive film 3 is included as much as possible in a field of view, and a portion with the largest film thickness is selected. However, a portion where apparently specific cracks, defects, projections, foreign matters, and so on exist when observing the entire film, is not selected. Further, the observation is performed by raising the magnification in a range where the film thickness of the selected portion is included in the field of view.

In the selected respective cross sections at three locations or more, the film thickness of the sensitive film 3 is measured through the above-described method. By averaging the film thicknesses of the sensitive film 3 at the respective cross sections obtained as above, it is possible to calculate the measured film thickness of the sensitive film 3.

An average particle size of the metal organic framework 7 can also be measured by using the image observation of the optical microscope, the STEM, the TEM, or the SEM, in a similar manner to the film thickness measurement of the sensitive film 3. There can be cited a method in which image analysis software such as ImageJ is used to extract a contour of particle, and a method in which a contour of particle is extracted based on human judgment while watching an image. Further, by using, in addition to the image observation by the STEM or the like, the mapping image regarding the element (Zr or the like) derived from the component of the metal organic framework 7 at the cross section same as that captured by the EDX at the time of the film thickness measurement of the sensitive film 3, it is possible to judge the size and the shape of the particle. Further, in a case of a crystalline substance such as MOF, it is possible to estimate of an average particle size by utilizing a Debye-Scherrer method in which a half value width of a diffraction main peak and a crystal grain size are in a relation of inverse proportion, from a pattern obtained by the X-ray diffraction (XRD).

Concretely, a crystal grain size D (Å) is denoted by $D = K\lambda/(\beta \cos \theta)$. Here, K indicates a constant, and is generally 0.9, although depending on a form factor. $\beta$ indicates a half value width of diffraction peak (rad), $\lambda$, indicates a wavelength of X-ray, and in a case of CuKa1-ray, for example, $\lambda$ is 1.5406 (Å). $\theta$ indicates a Bragg angle (rad).

It is preferable that 50% or more of the metal organic framework 7 is Zr. This is because the Zr-based MOF has high heat resistance and high water resistance. When 50% or more of the MOF is Zr, this means that the concentration of Zr, among the metal element concentrations capable of being detected by the aforementioned EDX, is 50% or more.

The molecular sensor of the first embodiment has the surface covering layer made of the hydrophobic polymer 8, to thereby selectively absorb and transmit a volatile organic compound (VOC) that exists in the environment, and besides, it uses the metal organic framework that exists at a layer under the surface covering layer and has higher adsorption performance to adsorb and condense the volatile organic compound, which enables to perform high-sensitive detection that cannot be realized when the metal organic framework or the organosilicon polymer is solely used. Specifically, the MOF 7 can be operated as a molecular sensor by trapping target molecules in pores that the MOF 7 has, and thus the disposition of a film such as one blocking the pores to a surface of the MOF 7 can be estimated to lead the reduction in sensitivity. However, in the present embodiment, the VOC transmitted through the surface covering layer made of the hydrophobic polymer 8 is trapped by the MOF 7, which makes it possible to generate a concentration gradient in the target molecules that reach the MOF 7. In particular, when the VOC with high concentration is generated, the surface covering layer serves as a buffer layer to generate a time difference until when the VOC reaches the surface of the MOF 7, and thus it is possible to prevent that the pores at the surface of the MOF 7 are blocked in an instant to reduce the sensitivity. Further, generally, the metal organic framework adsorbs water vapor well, so that when it is likely to be in contact with water vapor, the adsorption of target molecules to be detected is sometimes inhibited. Further, under a humid environment, the sensitive film 3 is sometimes deteriorated by hydrolysis, but since the surface covering layer exists, the adsorption of water vapor and the hydrolysis can be prevented. By providing the hydrophobic polymer 8 as above, it is possible to efficiently use the pores of the MOF 7, resulting in that the sensitivity as the molecular sensor can be improved.

As illustrated in FIG. 4, when a thickness of the sensitive film 3 is denoted by L, and a thickness of a region having an element concentration ratio Si/Zr of Si and Zr of 10 or more in the sensitive film 3 is denoted by d, the sensitive film 3 preferably satisfies 20 nm≤L≤10 μm, 5 nm≤d, and d/L≤0.7. When the thickness L is less than 10 nm, a layer of the metal organic framework 7 (Zr-based MOF 7a) is thin, and thus an absolute amount of the metal organic framework is small and an amount of the target molecules 11 capable of being adsorbed is small as well, resulting in that the sensitivity is reduced. Further, there is a need to increase an area of the sensitive film 3 for securing the sensitivity of the sensitive film 3, and thus there is a need to increase a device size. When the thickness L exceeds 10 μm, an occurrence rate of cracks or the like due to an internal stress of the sensitive film 3 is increased, and not only that, when the sensitive film 3 is combined with the measuring device such as the QCM or the MCL, for example, there is a possibility that an oscillation resistance is increased and the oscillation cannot be performed. Further, even if the oscillation can be performed, the sensitivity is reduced.

The thickness L of the sensitive film 3 is preferably 50 nm or more and 5 μm or less. When the thickness L is within this range, it is possible to increase an absolute amount of the MOF, and an amount of the target molecules capable of being adsorbed can be increased as well, resulting in that the sensitivity can be improved. If the thickness d of the region having the element concentration ratio Si/Zr of Si and Zr of 10 or more in the sensitive film 3 is 5 nm or more, it becomes possible to perform uniform covering with no pinholes, which enables to secure the above-described sensitivity improving effect and barrier property with respect to water vapor. However, if the thickness d is excessively large, an adsorption rate of the target molecules is reduced to lower responsiveness of the sensor, so that by setting d/L being a ratio of the thickness d to the thickness L to 0.7 or less, it is possible to keep the balance between the responsiveness and the sensitivity.

A dimension of the QCM detection unit 2 is not limited in particular, and it may also be similar to that of a general QCM element. For example, a diameter of the base 4 is preferably about 2 mm to 10 mm. For example, when viewed in a plan view, the sensitive film 3 is preferably formed in a disk shape that is concentric with the upper excitation part 5a and has a diameter smaller than that of the upper excitation part 5a. The diameter of the sensitive film 3 is not limited, but is preferably set to have an area of 20% to 90% of an area of flat surface of the base 4, for example. As described above, the thickness of the sensitive film 3 preferably satisfies 20 nm≤L≤10 μm, 5 nm≤d, and d/L≤0.7.

When the target molecules adhere to the sensitive film 3 of the molecular sensor 10, an energy loss corresponding to the mass of the target molecules is generated, which changes a vibration frequency of the base 4. This change is measured, to thereby generate an electrical signal. The generated electrical signal is sent to the analysis unit 16. Consequently, the target molecules 11 can be detected.

The molecular sensor 10 may further include an AC power supply that applies a voltage to the upper electrode 5 and the lower electrode 6 via a wire such as a lead wire, and a frequency measuring device that detects a frequency of the base 4. The molecular sensor 10 may also include a temperature adjusting device that heats the sensitive film 3. By heating the sensitive film 3, it is possible to remove the adsorbed target molecules, for example.

Second Embodiment

A molecular sensor of a second embodiment has a measuring device using a micro cantilever (MCL) as a detection unit.

Figure 5A:
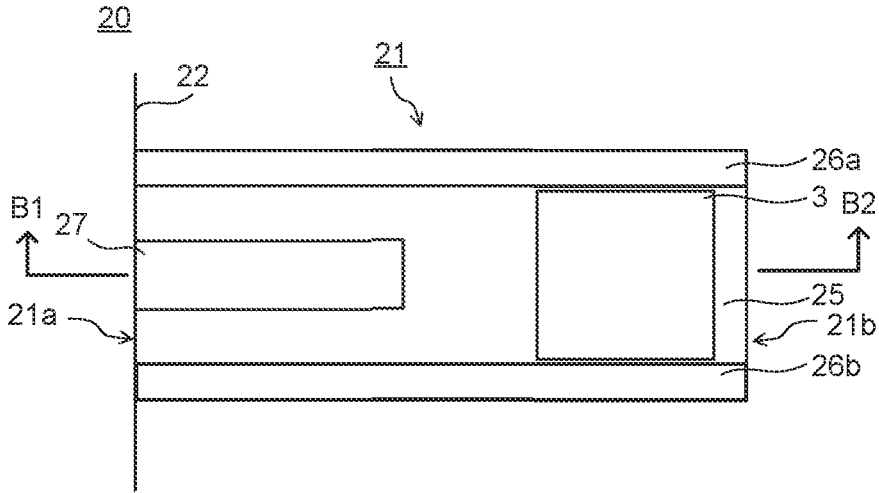
FIG. 5A is a schematic view illustrating another example of the molecular sensor.
Figure 5B:
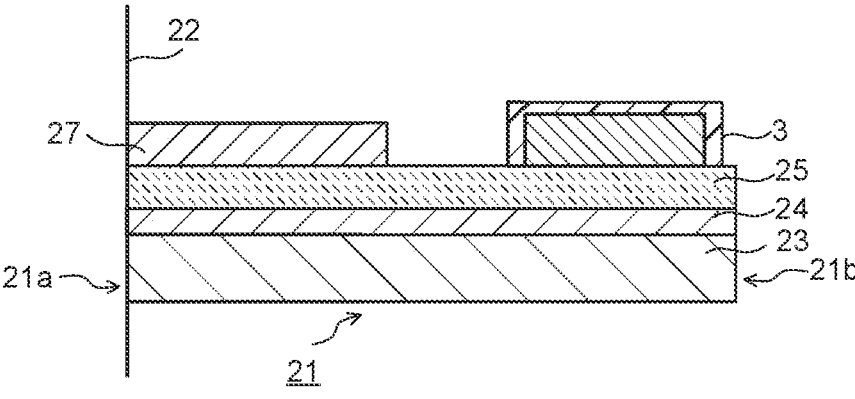
FIG. 5B is schematic view illustrating another example of the molecular sensor.

FIG. 5A and FIG. 5B are schematic views illustrating another example of the molecular sensor. FIG. 5A is a schematic plan view of a molecular sensor 20, and FIG. 5B is a schematic cross-sectional view taken along a line segment B1-B2 of the molecular sensor 20.

The molecular sensor 20 includes a MCL detection unit 21, and a sensitive film 3.

The MCL detection unit 21 is a long rectangle in a plan view, and has a fixed end 21a fixed to a support 22, and a free end 21b that is not fixed. Specifically, the MCL detection unit 21 has a shape of cantilever. The MCL detection unit 21 has a layer structure, and has a substrate 23 provided at the lowermost layer, a lower electrode 24 stacked on the substrate 23, a piezoelectric body 25 stacked on the lower electrode 24, a first upper electrode 26a and a second upper electrode 26b respectively stacked on the piezoelectric body 25 and extending in a long shape along two long sides, and a detection electrode 27 stacked on the piezoelectric body 25 and positioned on the fixed end 21a side between the first upper electrode 26a and the second upper electrode 26b.

The substrate 23 is formed by using a material such as silicon, glass, or resin, for example.

The sensitive film 3 is preferably fixed to a portion close to the free end 21b at the uppermost surface of the MCL detection unit 21. The sensitive film 3 is fixed onto the piezoelectric body 25 between the first upper electrode 26a and the second upper electrode 26b, for example. At a position between the piezoelectric body 25 and the sensitive film 3, it is also possible to provide, although not illustrated, a film such as a conductive film such as an Au thin film, an insulating film of $SiO_2$ or the like, a metal oxide film of aluminum oxide ($Al_2O_3$), titanium oxide ($TiO_2$), or the like, a film of silane coupling agent, or a self-assembled monolayer.

The first upper electrode 26a, the second upper electrode 26b, and the lower electrode 24 are connected to the AC power supply, for example, to apply the AC voltage to the piezoelectric body 25. The detection electrode 27 detects a frequency of the piezoelectric body 25.

Each of the first upper electrode 26a, the second upper electrode 26b, the lower electrode 24, and the detection electrode 27 contains a metal material such as, for example, platinum, gold, molybdenum, tungsten, or aluminum. One of the first upper electrode 26a, the second upper electrode 26b, the lower electrode 24, and the detection electrode 27, and another of them may be formed by using mutually different materials.

The piezoelectric body 25 deforms due to the application of voltage, and thus it expands and contracts due to the AC voltage to oscillate at a predetermined resonant frequency. The piezoelectric body 25 is formed by using, for example, lead zirconate titanate (PZT), a solid solution of lead zinc niobate-lead titanate (PZN-PT), a solid solution of lead manganate niobate-lead zirconate titanate (PMnN-PZT), aluminum nitride (AlN), zinc oxide (ZnO), potassium sodium niobate (KNN), lithium niobate ($LiNbO_3$), or the like.

A dimension of the MCL detection unit 21 is not limited in particular, and it may also be similar to that of a general MCL element. For example, a dimension of the sensitive film 3 when viewed in a plan view can be set to have an area of 20% to 90% of an area of the MCL detection unit 21. The sensitive film 3 preferably satisfies 20 nm≤L≤10 μm, 5 nm≤d, and d/L≤0.7, in the same manner as in the first embodiment. For the other explanation of the sensitive film 3, the explanation of the first embodiment can be cited appropriately.

The molecular sensor 20 can also use a detection method similar to that of the molecular sensor 10 of the first embodiment. When target molecules adhere to the sensitive film 3 of the molecular sensor 20, an energy loss corresponding to the mass of the target molecules is generated, which changes the resonant frequency of the piezoelectric body 25. This change is measured by the detection electrode 27, to thereby generate an electrical signal. The generated electrical signal is sent to the analysis unit 16. Consequently, the target molecules can be detected.

In FIG. 5A and FIG. 5B, the example of using the MCL detection unit 21 has been explained, but the detection unit is not limited to these and another measuring device may be used. The detection unit is preferably a mechanism capable of measuring a mass change of the sensitive film 3, for example. Another example of the detection unit may include a surface acoustic wave (SAW). The detection unit including SAW is provided with, for example, two sets of interdigitated electrodes (IDEs) arranged with a desired interval provided therebetween, on a surface of a piezoelectric substrate. The sensitive film 3 can be arranged between the two sets of electrodes on the piezoelectric substrate, for example. When target molecules adhere to the sensitive film 3, a change occurs in a propagation velocity and an amplitude of surface acoustic wave that propagates through the surface of the piezoelectric substrate, and the change is detected by the two electrodes, to thereby generate an electrical signal. The generated electrical signal is sent to the analysis unit 16. Consequently, the target molecules can be detected.

Another example of the detection unit may include a measuring device capable of measuring a change in electrical resistance, impedance, electrical conductivity, or the like of the sensitive film 3, for example. Such a detection unit has, for example, a field effect transistor (FET), or an interdigitated electrode (IDE)-type sensor. When having the FET, for example, the sensitive film 3 functions as a channel layer that forms a channel between a source electrode and a drain electrode, for example. When having the IDE-type sensor, the sensitive film 3 is provided between or on electrodes of IDE, for example. For the other explanation of the sensitive film 3, the explanation of the first embodiment can be cited appropriately.

EXAMPLES

A QCM molecular sensor including the sensitive film 3 was manufactured, and this molecular sensor was used to detect target molecules.

Example 1

[Preparation of UIO-66 Precursor Solution]

$ZrOC_{12} \cdot 8H_2O$ of 18.6 mg, benzene dicarboxylic acid of 9.5 mg, acetic acid of 280 mg, and dimethylformamide of 9.4 g were weighed and mixed, to thereby form a precursor solution.

[Application of Precursor Solution onto QCM]

On one side of a QCM detection unit 2 having a resonant frequency of 20 MHz, a stacked film of a Ti layer with a thickness of 10 nm and a $SiO_2$ layer with a thickness of 100 nm, was formed as a base layer. The QCM detection unit 2 was subjected to ultrasonic cleaning with acetone and pure water, respectively, it was then dried by a $N_2$ blower and then placed at a center of a mini petri dish. With the use of a micropipet, an appropriate amount of the above precursor solution was applied by being dropped on a surface formed with the $SiO_2$ layer, which was set as an upper surface, so that the solution was spread over the whole QCM surface. After that, the mini petri dish was covered with an upper lid and allowed to stand until when the solvent evaporated, and then the QCM detection unit 2 was taken out and placed on a fluorine-based resin block with a length of one side of 1 cm.

[Formation of UIO-66 Film]

A mixed solution of acetic acid of 0.8 ml and dimethylformamide of 4.2 ml was put in a glass container with a volume capacity of 100 ml, and the fluorine-based resin block with the QCM detection unit 2 placed thereon was placed at a bottom of the glass container while being kept horizontally. The glass container was put in an oven in a manner that the solution in the glass container was not directly brought into contact with the QCM detection unit 2, and heated at a temperature of 100° C. for 3 hours. Accordingly, crystallization proceeded under the solvent atmosphere, to thereby obtain a thin film made of UIO-66 fine particles. After that, the QCM detection unit 2 was taken out of the glass container, and heated in the atmosphere at a temperature of 120° C. for 2 hours by using a hot plate, to thereby remove excessive solvent and moisture. Consequently, the QCM molecular sensor having UIO-66 was obtained.

[Stacking of Organosilicon Polymer Film]

As an organosilicon polymer, KR-255 manufactured by Shin-Etsu Chemical Co., Ltd. was diluted by toluene until when a solid content thereof became 0.2 mass %, an appropriate amount of the diluted KR-255 was dropped on the obtained UIO-66 film with a microsyringe, and the solvent was evaporated at a room temperature. After that, heat treatment was performed at a temperature of 110° C. for 15 minutes, and then heating was performed at 200° C. for 2 hours to form the organosilicon polymer film, and the film was stacked on the UIO-66 film. Consequently, the sensitive film 3 was formed.

[Film Analysis at Cross Section]

An example of a physical property evaluation method of the sensitive film 3 formed by the method as described above will be described. First, when an optical microscope was used to perform observation at a magnification at which the entire region formed with the sensitive film 3 was included as much as possible in a field of view, a portion with the largest film thickness was selected. However, a portion where apparently specific cracks, defects, projections, foreign matters, and so on existed when observing the entire film, was not selected. Next, the selected portion of the sensitive film 3 was subjected to focused ion beam (FIB) machining, and a cross section was observed by the STEM. Note that an area of the observation region was set to a square or more of the film thickness defined above.

Figure 7:
FIG. 7 is a view illustrating an example of a Zr element mapping image.
Figure 8:
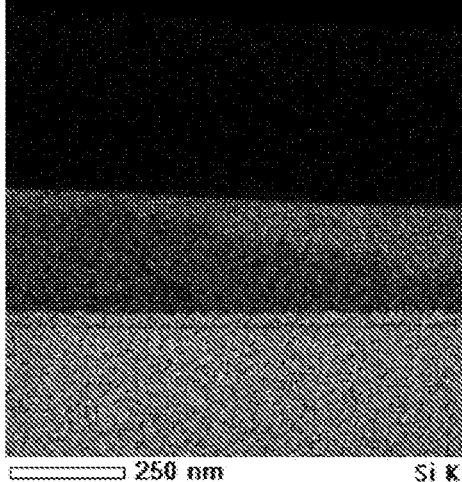
FIG. 8 is a view illustrating an example of a Si element mapping image.

Further, the observation was performed by raising the observation magnification in a range where the film thickness of the selected portion was included in the field of view. In the example 1, a thickness of the sensitive film 3 was measured from a cross-sectional STEM image in FIG. 6, in which, in the field of view, the film thickness of the sensitive film 3 was 270 nm at the thickest portion, and was 225 nm at the thinnest portion. Further, when a distribution of Zr and a distribution of Si were respectively checked through element mapping by using the EDX, it was possible to confirm a Zr-based MOF layer and an organosilicon polymer layer by contrast, as illustrated in FIG. 7 and FIG. 8. FIG. 7 is a Zr mapping image. FIG. 8 is a Si mapping image.

Figure 6:
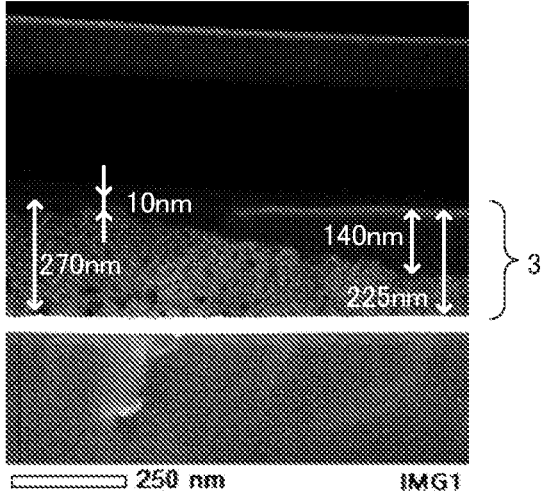
FIG. 6 is a view illustrating an example of a cross-sectional STEM image.
Figures 9, 10:
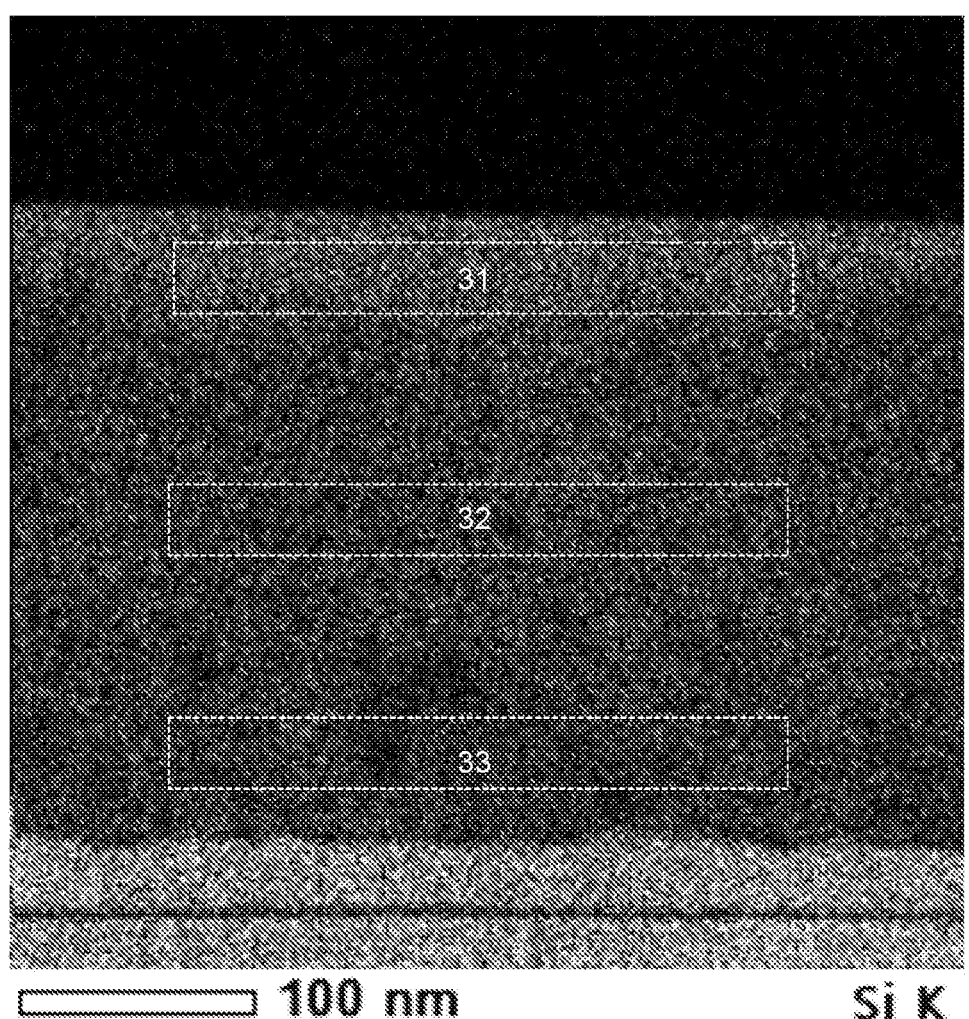
FIG. 9 is an enlarged image of a part of the Si element mapping image illustrated in FIG. 8.
FIG. 10 is a view illustrating a measurement result of a ratio Si/Zr.

As illustrated in FIG. 6, the thickness of the organosilicon polymer film was 10 nm at the thinnest portion, and was 140 nm at the thickest portion. Besides, in an image of further enlarging FIG. 6, the concentration ratio Si/Zr of the Si element and the Zr element was calculated at a portion 31, a portion 32, and a portion 33 located at different positions in the thickness direction in the order from the surface side of the sensitive film 3. FIG. 9 illustrates an enlarged image of a part of the Si element mapping image illustrated in FIG. 8. FIG. 10 illustrates the measurement result of the concentration ratio Si/Zr. As illustrated in FIG. 10, the ratio Si/Zr at the portion 31 included in the organosilicon polymer layer was 39.38, the ratio Si/Zr at the portion 32 was 1.88, and the ratio Si/Zr at the portion 33 was 1.87.

[Particle Size Analysis]

Figure 11:
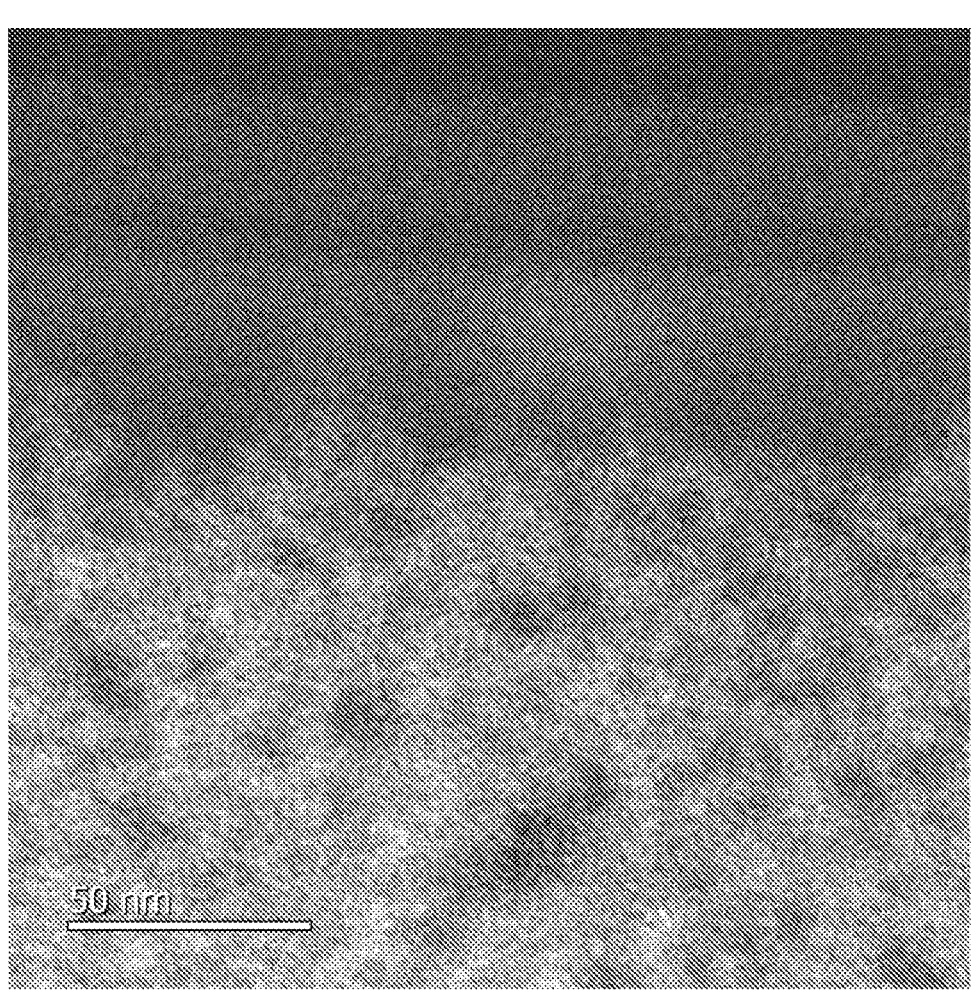
FIG. 11 is a view illustrating an example of a cross-sectional STEM image.

In the example 1, an average particle size of the UIO-66 fine particles was estimated as 10 nm, as an average value of 10 points at which a contour extraction was performed from a cross-sectional STEM image in FIG. 11. FIG. 11 is a cross-sectional STEM image where the observation was performed, the image being obtained by enlarging a part of the sample cross section from which the element mapping image was obtained.

Comparative Example 1

[Formation of Dispersion Film]

In the same manner as in the example 1, on one side of a QCM detection unit 2 having a resonant frequency of 20 MHz, a stacked film of a Ti layer with a thickness of 10 nm and a $SiO_2$ layer with a thickness of 100 nm on the Ti layer, was formed as a base layer. The QCM detection unit 2 was subjected to ultrasonic cleaning with acetone and pure water, respectively, it was then dried by a $N_2$ blower and then placed at a center of a mini petri dish. KR-255 manufactured by Shin-Etsu Chemical Co., Ltd. was diluted by toluene until when a solid content thereof became 0.2 mass %, and with the use of a micropipet, an appropriate amount of the diluted KR-255 solution was dropped on a surface formed with the $SiO_2$ layer, which was set as an upper surface. Before completely drying the solvent of the KR-255 solution, an appropriate amount of UIO-66 precursor solution same as that of the example 1 was dropped, and dried at a room temperature until when the solvent disappeared in visual observation. After that, in the same manner as in the example 1, heating was performed by using an oven at a temperature of 100° C. for 3 hours to facilitate crystal growth, to thereby obtain a thin film made of UIO-66 fine particles. Further, the QCM detection unit 2 was taken out of a glass container, and heated in the atmosphere at a temperature of 200° C. for 2 hours by using a hot plate, to thereby remove excessive solvent and moisture, and complete a silicone curing reaction. Consequently, the QCM molecular sensor having the sensitive film 3 being the dispersion film having UIO-66 and the organosilicon polymer was obtained.

[Film Analysis at Cross Section]

Figure 12:
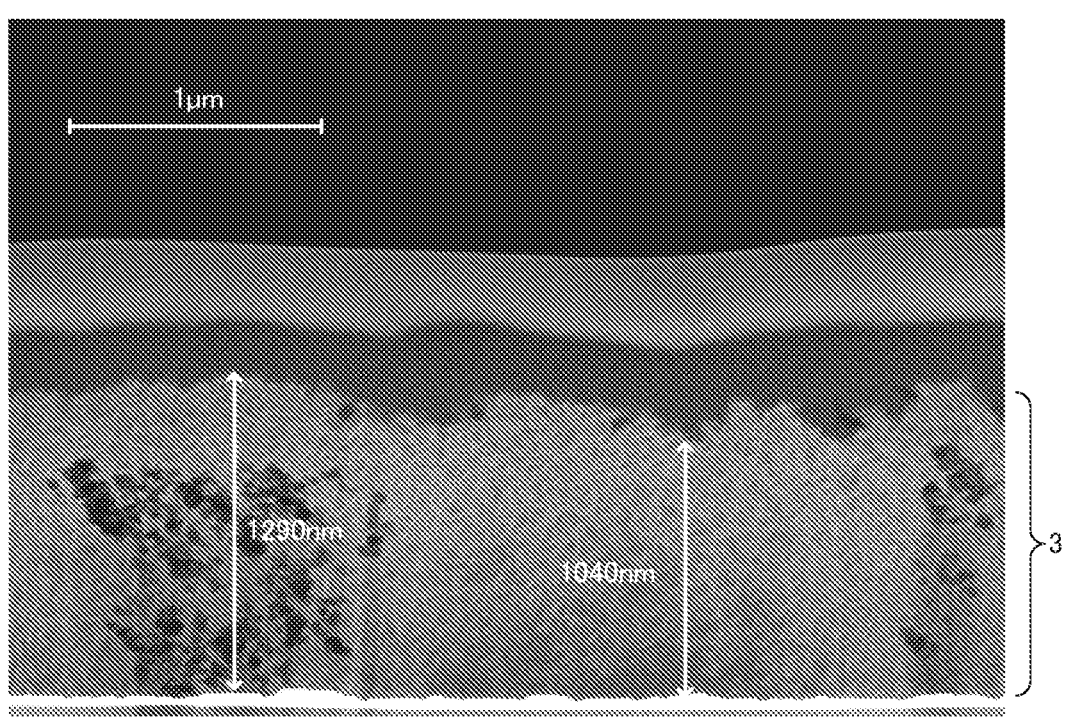
FIG. 12 is a view illustrating an example of a cross-sectional STEM image.
Figure 13:
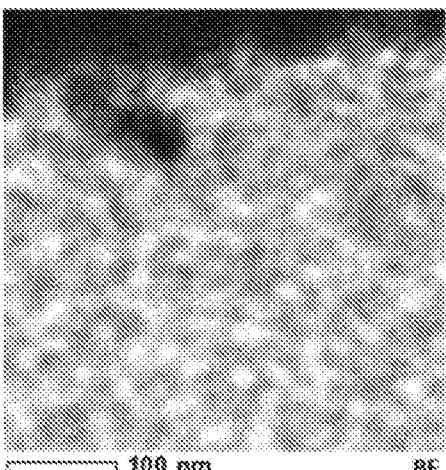
FIG. 13 is a view illustrating an example of a cross-sectional STEM image.
Figure 14:
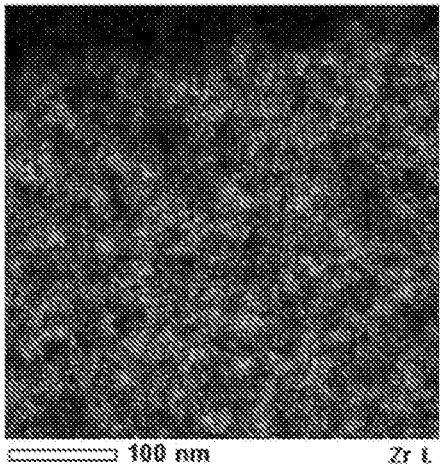
FIG. 14 is a view illustrating an example of a Zr element mapping image.
Figure 15:
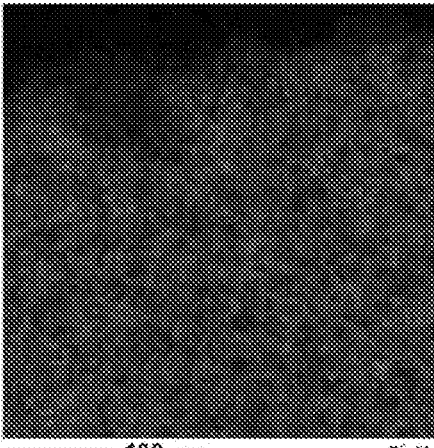
FIG. 15 is a view illustrating an example of a Si element mapping image.
Figure 16:
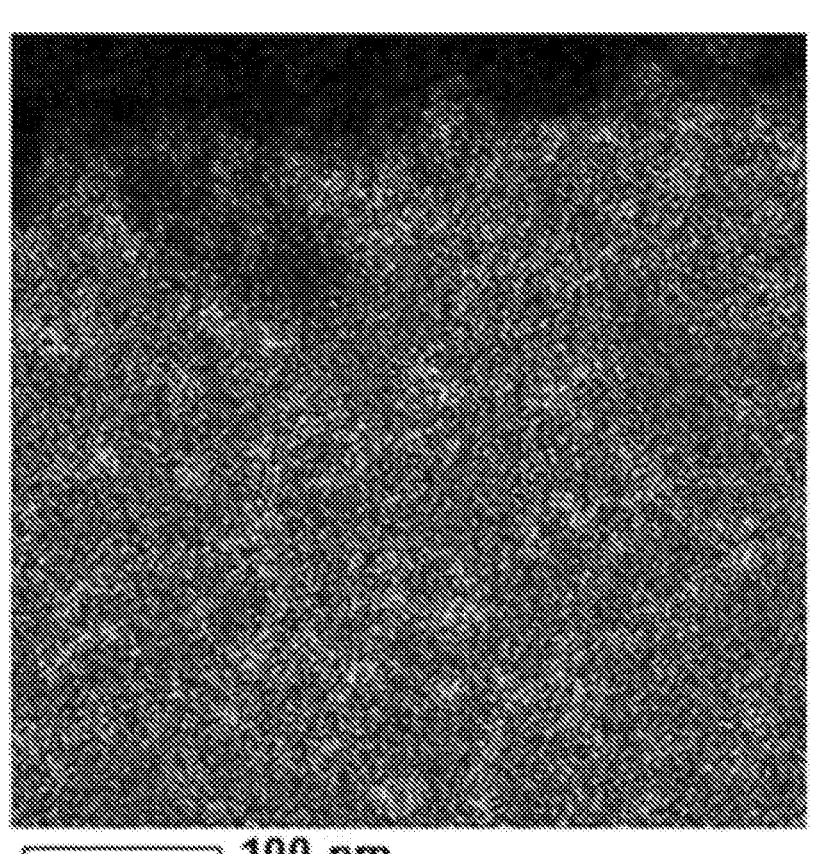
FIG. 16 is a view illustrating an example of a synthesized mapping image of Zr and Si.
Figure 17:
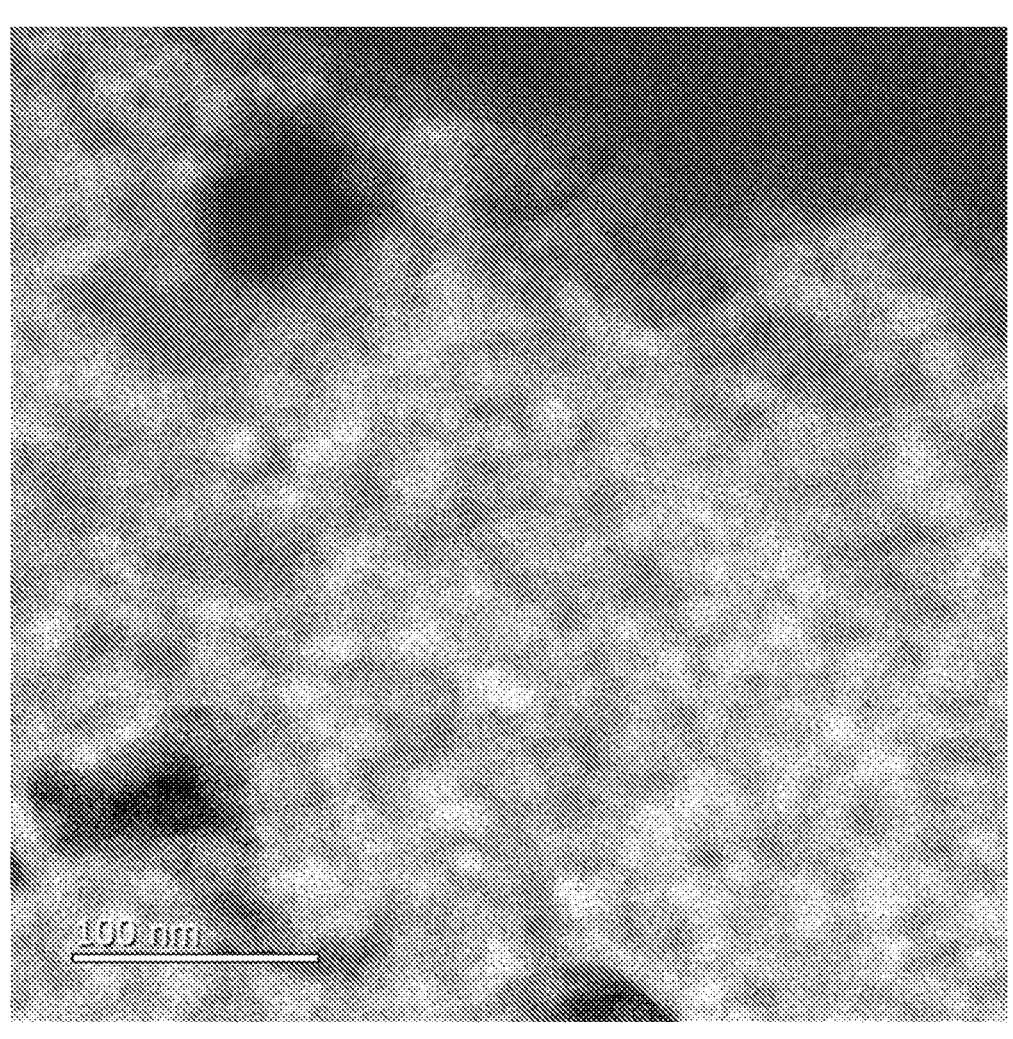
FIG. 17 is a view illustrating an example of a cross-sectional STEM image.

When, by the same method as in the example 1, a thickness of the sensitive film 3 was measured within a field of view from a cross-sectional STEM image illustrated in FIG. 12, the thickness was 1290 nm at the thickest portion, and was 1040 nm at the thinnest portion. Further, the observation was performed by raising the observation magnification in a range where the film thickness of the selected portion was included in the field of view. In the comparative example 1, when, from a cross-sectional STEM image in FIG. 13, a distribution of Si and a distribution of Zr were respectively checked by the EDX through element mapping as illustrated in FIG. 14 and FIG. 15, the Si component derived from the silicone resin and the Zr component derived from UIO-66 were in a mixed state as illustrated in FIG. 16, the uppermost surface of the sensitive film 3 had a large number of portions with exposed Zr component, and since there existed no region where the concentration ratio Si/Zr of the Si element to the Zr element was 10 or more, it was not possible to define the existence of the surface covering layer. FIG. 14 is a Zr mapping image. FIG. 15 is a Si mapping image. FIG. 16 is a mixed mapping image of Zr and Si. Further, an average particle size of the UIO-66 fine particles was estimated as 9 nm, as an average value of 10 points at which a contour extraction was performed from a STEM image in FIG. 17, by the same method as in the example 1. FIG. 17 is a cross-sectional STEM image where the observation was performed, the image being obtained by enlarging a part of the sample cross section from which the element mapping image was obtained.

Comparative Example 2

On one side of a QCM detection unit 2 having a resonant frequency of 20 MHz, a stacked film of a Ti layer with a thickness of 10 nm and a SiO$_2$ layer with a thickness of 100 nm was formed as a base layer, UIO-66 fine particles were formed by the same method as in the example 1, and an organosilicon polymer film was not formed, to thereby form a film made solely of MOF.

Comparative Example 3

On one side of a QCM detection unit 2 having a resonant frequency of 20 MHz, a stacked film of a Ti layer with a thickness of 10 nm and a SiO$_2$ layer with a thickness of 100 nm was formed as a base layer, UIO-66 in the example 1 was not formed, and by the same method as in the example 1, KR-255 was used to form a film made solely of organosilicon polymer.

[Contact Angle Evaluation]

Contact angles with respect to water of the films produced in the example 1, and the comparative examples 1, 2, and 3 were evaluated. Results are shown in Table 1. The contact angle with respect to water of the surface of the MOF film produced in the example 1 was about 20 degrees. On the contrary, the contact angle with respect to water of the sensitive film 3 after forming the polymer film was about 89 degrees. From these results, it was possible to confirm that in the example 1, the MOF film was covered with the hydrophobic polymer film. On the other hand, the contact angle with respect to water of the film made solely of hydrophobic polymer produced in the comparative example 3 was about 89 degrees. Further, the contact angle with respect to water of the dispersion film of MOF and hydrophobic polymer produced in the comparative example 1 was about 55 degrees. The contact angle with respect to water of the film made solely of MOF produced in the comparative example 2 was about 20 degrees. The above indicates that the dispersion film of MOF and hydrophobic polymer in the comparative example 1 has the contact angle whose value is in between the value of the contact angle of the comparative example 2 and the value of the contact angle of the comparative example 3, and the component of UIO-66 and the component of KR-255 are respectively exposed to the surface.

[First Humidity Dependence and Sensitivity Evaluation Test]

By using a portable QCM measuring device (THQ-100P-SW model) manufactured by TAMADEVICE Co., Ltd., the QCM molecular sensor in the example 1 was connected to a personal computer (PC). As VOC, 2-MIB (2-methylisoborneol) known as one of substances causing musty odor that is often cited as a complaint with respect to tap water, was used. A gas generated from a reagent bottle of 2-MIB was fed to the QCM molecular sensor at a flow rate of 300 ml/min by using an atmospheric air as a carrier gas, and a frequency change was recorded. In addition, a frequency change with respect to a humidity change in the atmosphere at a room temperature of about 20° C. and having absolute humidity of 6800 ppm to 8000 ppm, was also evaluated. Regarding the comparative example 2 and the comparative example 3, a frequency change with respect to a humidity change was evaluated by the same method. Results are shown in Table 1.

The humidity dependence in the comparative example 2 provided with the film made solely of MOF was 0.081 Hz/ppm, and the frequency change per unit time with respect to the 2-MIB gas corresponding to 40 ppb was 0.68 Hz/min. On the contrary, the humidity dependence in the example 1 provided with the stacked film of MOF and hydrophobic polymer was 0.051 Hz/ppm, and the frequency change per unit time with respect to the 2-MIB gas corresponding to 40 ppb was 2.92 Hz/min. Further, the humidity dependence in the comparative example 3 provided with the film made solely of hydrophobic polymer was 0.005 Hz/ppm, and the frequency change per unit time with respect to the 2-MIB gas corresponding to 40 ppb was 0.036 Hz/min.

[Second Humidity Dependence and Sensitivity Evaluation Test]

By using a portable QCM measuring device (THQ-100P-SW model) manufactured by TAMADEVICE Co., Ltd., the QCM molecular sensor in the comparative example 1 was connected to a PC. In the same manner as in the example 1, 2-MIB (2-methylisoborneol) was used, and a gas generated from a reagent bottle was fed to the QCM molecular sensor at a flow rate of 300 ml/min by using an atmospheric air as a carrier gas, and a frequency change was recorded. In addition, a frequency change with respect to a humidity change was first evaluated in the atmosphere at a room temperature of about 20° C. and having absolute humidity of 4600 ppm to 4800 ppm. Regarding the example 1 and the comparative example 3, a frequency change with respect to a humidity change was evaluated by the same method. Results are shown in Table 1.

The humidity dependence in the example 1 provided with the stacked film of MOF and hydrophobic polymer was 0.167 Hz/ppm, and the frequency change per unit time with respect to the 2-MIB gas corresponding to 150 ppb was 6.55 Hz/min. On the contrary, the humidity dependence in the comparative example 1 provided with the dispersion film of MOF and hydrophobic polymer was 0.024 Hz/ppm, and the frequency change per unit time with respect to the 2-MIB gas corresponding to 150 ppb was 1.13 Hz/min. Further, the humidity dependence in the comparative example 3 provided with the film made solely of hydrophobic polymer was 0.009 Hz/ppm, and the frequency change per unit time with respect to the 2-MIB gas corresponding to 150 ppb was 0.144 Hz/min. From the above results, it was clarified that the water repellency of the dispersion film of MOF and hydrophobic polymer was further deteriorated than that of the stacked film of MOF and hydrophobic polymer. Further, it was clarified that the dispersion film of MOF and hydrophobic polymer had a tendency of improving the humidity dependence, but the sensitivity with respect to 2-MIB was noticeably lowered.

a contact angle respect to water of the hydrophobic polymer being larger than that of the metal organic framework, wherein the metal organic framework is on the base side of the sensitive film, and the hydrophobic polymer is above the metal organic framework in the sensitive film.

2. The molecular sensor according to claim 1, wherein the sensitive film has a region between the hydrophobic polymer and the metal organic framework, the region having a concentration gradient of the hydrophobic polymer, the concentration gradient being from a surface of the sensitive film toward the base along a thickness direction of the sensitive film.

3. The molecular sensor according to claim 1, wherein a concentration of the hydrophobic polymer changes the most in a region between the hydrophobic polymer and the metal organic framework in the sensitive film.

4. The molecular sensor according to claim 1, wherein the contact angle with respect to water of a surface of the sensitive film is 60 degrees or more.

5. The molecular sensor according to claim 1, wherein the hydrophobic polymer is an organosilicon polymer or a fluoropolymer.

TABLE 1

| | Exam. 1 | Com. Exam. 1 | Com. Exam. 2 | Com. Exam. 3 |
|---|---|---|---|---|
| Structure | Stacked film of MOF and hydrophobic polymer | Dispersion film of MOF and hydrophobic polymer | Film made solely of MOF | Film made solely of hydrophobic polymer |
| Contact angle (degree) | 89.4 | 55.3 | 20.1 | 88.6 |
| Humidity dependence @ 40 ppb (Hz/ppm) | 0.051 | — | 0.081 | 0.005 |
| Frequency change @ 40 ppb (Hz/min) | 2.92 | — | 0.68 | 0.036 |
| Humidity dependence @ 150 ppb (Hz/ppm) | 0.167 | 0.024 | — | 0.009 |
| Frequency change @ 150 ppb (Hz/min) | 6.55 | 1.13 | — | 0.144 |

From the above evaluation results, it was clarified that by covering the MOF layer with the hydrophobic polymer layer, it was possible to reduce the influence of humidity, and it was also possible to improve the sensitivity. Further, it was also clarified that, with the use of the film made solely of hydrophobic polymer, the sensitivity could not be obtained since the film could not retain VOC, although having high capability of transmitting VOC therethrough, but by stacking the film on the MOF film with high adsorption performance, it was possible to obtain the sensitivity far beyond the performance of the MOF film alone.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A molecular sensor detectable of a target molecule by measuring a change in physical quantity caused by adsorption of the target molecule, the molecular sensor comprising:

a base; and a sensitive film provided above the base and containing a metal organic framework and a hydrophobic polymer,

6. The molecular sensor according to claim 5, wherein the organosilicon polymer is organopolysiloxane, a cross-linked product of the organopolysiloxane through peroxide vulcanization, a cross-linked product of the organopolysiloxane through addition reaction vulcanization, a cross-linked product of the organopolysiloxane through condensation reaction vulcanization, or a silicone resin.

7. The molecular sensor according to claim 1, wherein the metal organic framework contains zirconium.

8. The molecular sensor according to claim 1, wherein when the hydrophobic polymer is an organosilicon polymer, the sensitive film satisfies:

$20 \text{ nm} \le L \le 10 \text{ } \mu\text{m}$;

$5 \text{ nm} \le d$; and $d/L \le 0.7$, where L denotes a thickness of the sensitive film, d denotes a thickness of a region having Si/Zr of 10 or more, Si/Zr denotes an element concentration ratio of silicon to zirconium in the sensitive film.

9. The molecular sensor according to claim 1, wherein the metal organic framework has particles with an average particle size of 5 nm or more and 500 nm or less.

10. The molecular sensor according to claim 1, wherein the metal organic framework has a structure in which carboxylic acids are coordinated to a hexanuclear $Zr_6O_4(OH)_4$ cluster.

11. The molecular sensor according to claim 1, wherein the metal organic framework is at least one selected from the group consisting of UIO-66, UIO-67, UIO-68, and their derivatives.

12. The molecular sensor according to claim 1, further comprising a temperature adjusting device configured to heat the sensitive film.

13. A molecular detection apparatus, comprising the molecular sensor according to claim 1.

14. The molecular detection apparatus according to claim 13, wherein the molecular sensor includes at least one measuring device selected from the group consisting of a measuring device using a quartz crystal microbalance, a measuring device using a surface acoustic wave, and a measuring device using a micro cantilever.

* * * * *